(12) United States Patent
Vergnes et al.

(10) Patent No.: US 8,745,410 B2
(45) Date of Patent: Jun. 3, 2014

(54) METHOD AND APPARATUS TO SCRAMBLE DATA STORED IN MEMORIES ACCESSED BY MICROPROCESSORS

(75) Inventors: Alain Vergnes, Trets (FR); Renaud Tiennot, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 779 days.

(21) Appl. No.: 12/406,817

(22) Filed: Mar. 18, 2009

(65) Prior Publication Data

US 2010/0241874 A1    Sep. 23, 2010

(51) Int. Cl.
*H04L 29/06* (2006.01)

(52) U.S. Cl.
USPC ............................. 713/193; 713/189; 380/28

(58) Field of Classification Search
USPC ...................... 713/189–193; 380/277, 28–29
See application file for complete search history.

(56) References Cited

U.S. PATENT DOCUMENTS

| | | |
|---|---|---|
| 5,214,697 A | 5/1993 | Saito |
| 5,384,847 A | 1/1995 | Hendrickson et al. |
| 5,742,686 A | 4/1998 | Finley |
| 6,396,742 B1 * | 5/2002 | Korsh et al. ............... 365/185.22 |
| 6,792,528 B1 | 9/2004 | Hou |
| 7,334,131 B2 * | 2/2008 | Orlando et al. ................ 713/189 |
| 7,405,590 B1 * | 7/2008 | Kaneko ............................ 326/38 |
| 7,834,659 B1 * | 11/2010 | Im et al. ........................... 326/38 |
| 7,987,358 B1 * | 7/2011 | Walstrum et al. .............. 713/160 |
| 2002/0188857 A1 | 12/2002 | Orlando et al. |
| 2006/0202232 A1 * | 9/2006 | Takami ........................ 257/209 |
| 2006/0282901 A1 * | 12/2006 | Li et al. ........................... 726/26 |
| 2006/0294289 A1 * | 12/2006 | Ashmore ....................... 711/100 |

OTHER PUBLICATIONS

Bruce Schneier, Applied Cryptography, "Cipher Block Chaining Mode," 1996, John Wiley and Sons, Inc, Second Edition, 193-196.*
Schneier, Bruce. Applied Cryptography. 1996. John Wiley & Sons. Second Ed. 193-196.*

* cited by examiner

*Primary Examiner* — Fikremariam A Yalew
*Assistant Examiner* — Kendall Dolly
(74) *Attorney, Agent, or Firm* — Fish & Richardson P.C.

(57) ABSTRACT

A scrambler/descrambler module included in an integrated circuit device is operable for receiving a scrambling key and constant data that is unique to the integrated circuit device. The scrambler/descrambler module includes a first layer or circuit arrangement that uses a scrambling key to generate first scrambled data. The scrambler/descrambler module includes a second layer or second circuit arrangement that uses data that is unique to the integrated circuit device, and that is constant over the life of the integrated circuit device, to scramble the first scrambled data to generate second scrambled data.

16 Claims, 4 Drawing Sheets

ABSTRACT

METHOD AND APPARATUS TO SCRAMBLE DATA STORED IN MEMORIES ACCESSED BY MICROPROCESSORS

TECHNICAL FIELD

This subject matter relates generally to electronics, and more particularly to scrambling data stored in memories accessed by microprocessors.

BACKGROUND

For systems using a microcontroller executing part of its software in a discrete memory device connected through a printed circuit board, data accesses to/from the memory can be easily analyzed because of the physical access to the memory device or microcontroller package pins and/or copper lines of the printed circuit board. The memories may contain part of the software which runs on the microcontroller and therefore may contain intellectual property of the company which developed the software.

Scrambling the data makes the analysis more difficult, especially if the scrambling method depends on a user configurable key. Conventional scrambling algorithms, however, remain constant and can be determined by correlating large amounts of data. Even if the scrambling algorithm remains unknown, the key may be the same for a series of integrated circuit devices in a given revision/release of embedded software. As a consequence, the scrambling behavior can be the same among a series of integrated circuit devices in a given revision/release of embedded software, thus allowing the data to be recovered.

SUMMARY

A scrambler/descrambler module included in an integrated circuit device is operable for receiving a scrambling key and constant data that is unique to the integrated circuit device. The scrambler/descrambler module includes a first layer or circuit arrangement that uses a scrambling key to generate first scrambled data. The scrambler/descrambler module includes a second layer or second circuit arrangement that uses data that is unique to the integrated circuit device, and that is constant over the life of the integrated circuit device, to scramble the first scrambled data to generate second scrambled data.

The two layer circuit arrangement implements scrambling/descrambling algorithms that behave differently in each integrated circuit device that implements the scrambling/descrambling algorithms due to the use of data that is unique to the integrated circuit device and constant over the life of the integrated circuit device. The inclusion of additional circuitry for the second layer or circuit arrangement can be minor if the integrated circuit device includes a unique identifier (e.g., a unique chip identifier) that can be used as unique and constant data.

DETAILED DESCRIPTION

Example Microcontroller Architecture

Figure 1:
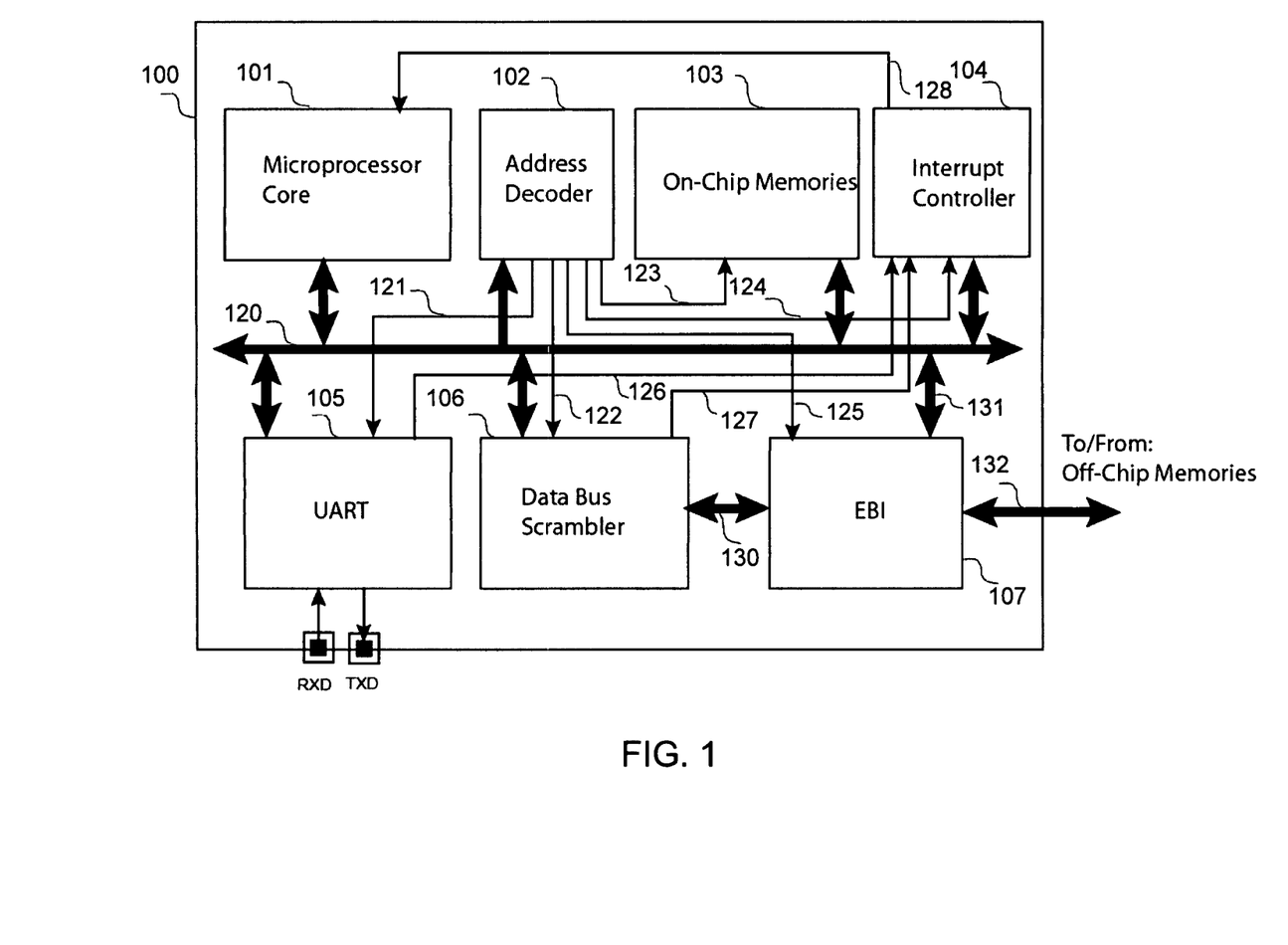
FIG. 1 is a block diagram of an example microcontroller with an embedded external bus interface (EBI) and data bus scrambler module.

FIG. 1 is a block diagram of an example microcontroller 100 with an embedded external bus interface (EBI) and data bus scrambler module. In some implementations, the microcontroller 100 can include a microprocessor core 101, an address decoder 102, on-chip memories 103, interrupt controller 104, universal asynchronous receiver/transmitter (UART) 105, data bus scrambler/descrambler 106 (hereinafter also referred to as "data bus scrambler module") and external bus interface (EBI) controller 107.

The microprocessor core 101 is operable for accessing peripheral circuits, such as UART 104 and EBI controller 107. Data exchanges are performed by means of system bus 120 which comprises (not shown) a read data bus for carrying data from peripherals to the microprocessor core 101, a write data bus for carrying data from the microprocessor core 101 to peripherals, and address bus and control signals to indicate transfer direction on the system bus 120. Address decoder 102 receives the address bus portion of the system bus 120 and generates or otherwise provides select signals 121, 122, 123, 124 and 125. These select signals are read by peripheral circuits 103, 104, 105, 106 and 107, and are used to enable the peripheral circuits to receive and process data and control signals carried on system bus 120.

On-chip memories 103 store the application software processed by the microprocessor core 101. When memories 103 have not enough capacity to store application software, off-chip memories (not shown) can be used through EBI controller 107 and its associated data bus scrambler module 106. The data bus scrambler module 106 includes an interface that is coupled to the system bus 120 to be configured and to receive data to be stored in off-chip memories after scrambling, or to provide data to the microprocessor core 101 after descrambling data through bus 130.

The data bus scrambler module 106 samples/generates data from/to system data bus data when the select signal 122 is set. The data bus scrambler module 106 is connected directly to the EBI controller 107 by means of bus 130. When data is to be stored outside the microcontroller 100 by microprocessor core 101, the data is sent to off-chip memories by feeding the system bus 120 with clear data (e.g., unscrambled data), the address on the system bus 120 enables the address decoder 102 to activate select signals 122 and 125.

The data bus scrambler module 106 detects a write access by decoding system bus 120 control signals (not shown). The data bus scrambler module 106 scrambles the data received and provides the scrambled data on bus 130. To scramble the data, the data bus scrambler module 106 uses a key provided by the embedded software during a startup sequence or at any appropriate time to make the scrambling efficient in terms of software protection and scrambled data recovery. The scrambling algorithm can be any algorithm that can also descramble the scrambled data read back from the external memories.

The EBI controller 107 is configured by means of the system bus 120 to select data from the bus 130 instead of bus 120 when scrambling is required. The EBI controller 107 translates the system bus 120 access into off-chip memory access by means of bus 132.

Since the scrambling key is internally stored, it is difficult to translate the data carried on bus 132 into any assembly code related to the microprocessor core 101 or any user data since the data is scrambled. To increase the scrambling efficiency, the scrambled data may also depend on the address location required by the access. Therefore, for each off-chip memory location the scrambling differs. When the scrambled data written to off-chip memory is required by the microprocessor core 101, a read access is placed on the system bus 120 with control signals set to "read," and the address decoder 102 activates signals 122 and 125. The EBI controller 107 translates the required access into off-chip memory read protocol access on bus 132, and the off-chip memory returns the scrambled data which is passed to EBI controller 107. The EBI controller 107 sets the scrambled data on bus 130. The data bus scrambler module 106 descrambles the scrambled data carried on bus 130. The data bus scrambler module 106 is selected at the same time the EBI controller 107 is selected. Thus the same address is presented by the system bus 120 on both the data bus scrambler module 106 and the EBI controller 107. The data bus scrambler module 106 drives the system bus 120 with clear data. The microprocessor 101 can execute the data if it is a code instruction or process the data in other cases without regard to how the data has been stored in memory.

Example Data Bus Scrambler Module

Figure 2A:
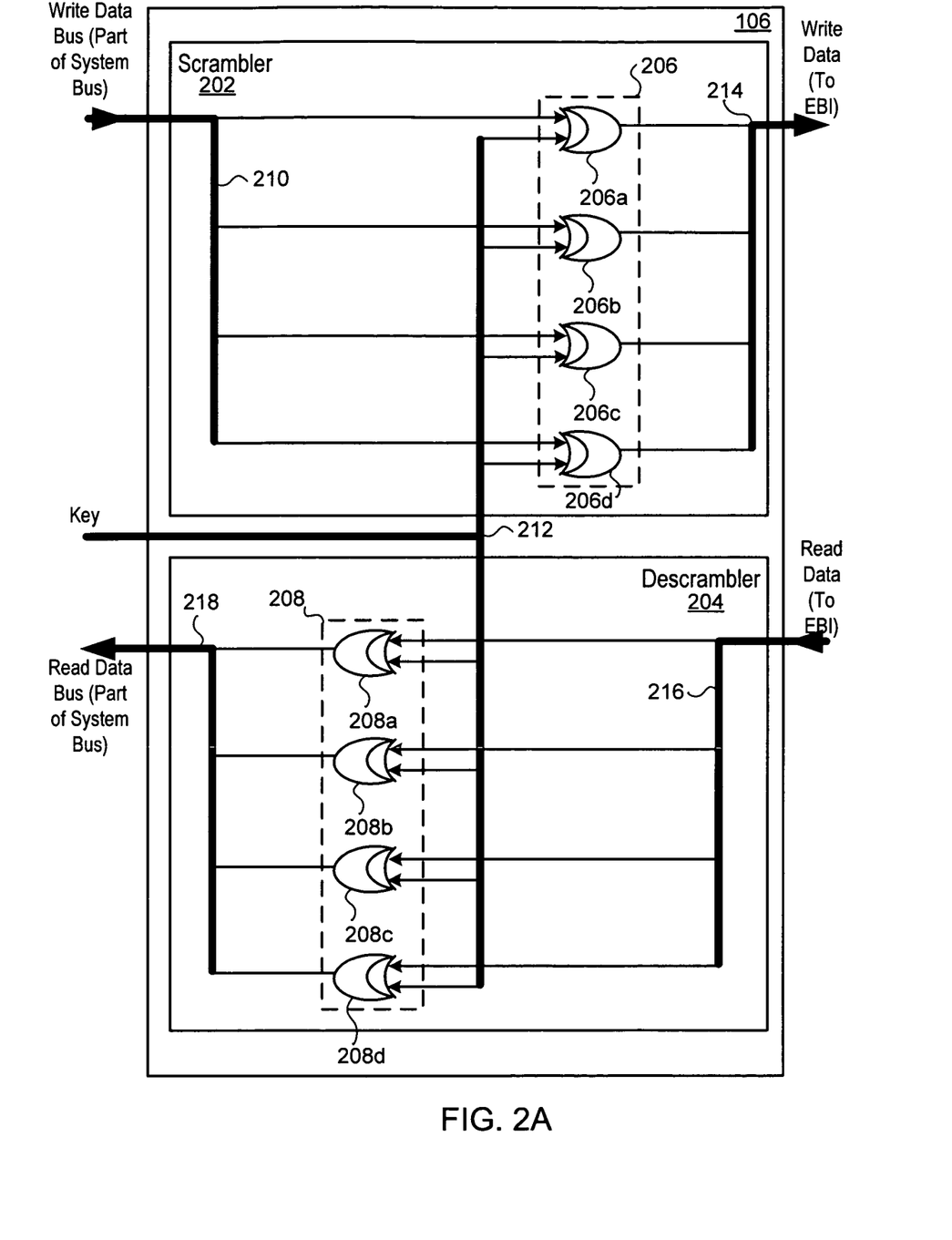
FIG. 2A is a block diagram of an example data bus scrambler module.

FIG. 2A is a block diagram of an example data bus scrambler module 106. The scrambler module 106 implements a scrambling/descrambling algorithm. For simplification, the logic associated with the select signal from the system bus 120 has been removed from FIG. 2A, and only the core architecture for scrambling and descrambling data is shown.

In some implementations, the module 106 includes a scrambler circuit 202 and a descrambler circuit 204. The scrambler circuit 202 is coupled to write input signal 210 (e.g., a portion of system bus 120). In this example, a 4-bit bus is shown. The scrambling function is performed by means of XOR gates 206. Each XOR gate has two inputs. A first input receives 1-bit of key signal 212 and the second input receives 1-bit of write input signal 210. For example, XOR gate 206a receives as inputs the least significant bit (LSB) of write input signal 210 and the LSB of key signal 212. And, XOR gate 206d receives as inputs the most significant bit (MSB) of write input signal 210 and the MSB of key signal 212. Each output of XOR gates 206 drives 1-bit of scrambled data onto write output signal 214 which is provided as input to EBI controller (e.g., EBI controller 107).

In some implementations, the same key signal 212 is used for both the scrambler circuit 202 and the descrambler circuit 204. The descrambler circuit 204 uses the same XOR technique in reverse direction to receive scrambled data from read input signal 216 and to descramble the data using XOR gates 208. Each output of XOR gates 208 drives 1-bit of clear data onto read output signal 218.

Assuming a key signal of "1010" (LSB 0) and a write input signal of "0110", the resulting output of scrambler circuit 106 is "1100" which is driven onto write output signal 214. Specifically, the LSB of write input signal 210 being 0 and the LSB of the key signal 212 being 0 results in a 0 output of XOR gate 206a. Similarly, the next bit LSB+1 of the write input signal 210 is 1 and the corresponding LSB+1 of the key signal 212 is 1 resulting in 0 in the LSB+1 of the output of XOR gate 206b. The output of XOR gate 206c and the output of XOR gate 206d are 1. Therefore, the binary value carried by write output signal 214 is binary "1100." This value differs from the write input signal "0110." The scrambler circuit 202 scrambled the data received on write input signal 210 from "0110" to "1100." This data will be processed by EBI controller 107 and written in off-chip memory.

When the scrambled data is read from external memory, the scrambled binary value will be presented on read input signal 216, and the reverse operation will be performed by 2-input XOR gates 208. The operation "1100" XOR "1010" results in "0110." Thus, the clear data is recovered and provided to the system bus 120 by means of read output signal 218. The XOR gate operations described above are summarized in the XOR Truth Table below.

TABLE I

XOR Truth Table

| A | B | A XOR B |
|---|---|---------|
| 0 | 0 | 0 |
| 0 | 1 | 1 |
| 1 | 0 | 1 |
| 1 | 1 | 0 |

In some implementations, the data bus scrambler 106 can be enhanced by multiple layers of XOR gates connected in series for each bit of the write/read input signals 210, 216. Also, the address bus of the system bus 120 can take part of the scrambling key.

The address value is known at the system and software. The scrambling key is also known to the software. The scrambling algorithm can be left undocumented for the software (or user) since its behavior is fully transparent for the software processed by the microprocessor 100.

Even with the data bus scrambler module 106, it remains possible to analyze huge amounts data to determine the scrambling algorithm. Therefore, having this new information, a competitor code or data running on the same type of integrated circuit device will be less protected because using all possible key values on a descrambler algorithm will lead sooner or later to the clear code or data. To make this analyses harder to perform the scrambling key can be of a higher size. But this may be impractical for some applications.

In some implementations, unpredictable or random data inherent in the integrated circuit device can be used to modify the scrambling and descrambling algorithms. Such data must be stable and must never change for the entire life of the integrated circuit device to ensure that the data can be recovered.

The reverse engineering of a first circuit device of a given circuit device family can be thwarted if a second circuit device of the same family does not have the same access signature at the external bus interface level for the same software processed under the same conditions. Modifying the scrambling algorithm makes the non-intrusive attacks (e.g., analyzing the current consumption) more inefficient because the analysis may not be reliable for another circuit of the same family. This makes the data privacy harder to break.

In microcontroller circuits containing analog cells it may be possible to find a set of calibration fuse bits that are programmed during manufacturing to calibrate analog cells. These fuse bits often cannot be read by software running on the circuit device. The fuse bits can be used to modify the scrambling algorithm and or the resulting scrambling key. The fuse bits are almost unpredictable because the values of the fuse bits depend on manufacturing factors like process variation, wafer lot, position of the circuit device on the wafer.

Some microcontrollers have a unique identifier (ID) (e.g., a unique chip identifier). The unique ID can be read by a user (or software). Even if this unique ID is known at the user level there is no knowledge on how the unique ID is used within the scrambling algorithm. The unique ID provides a way of differentiating between circuit devices of the same family.

Both the unique ID and calibration fuse bits can be combined together to form a unique data value that is constant over the life of the circuit device, and therefore can be used to modify the scrambling algorithm used by two or more circuit devices of the same family.

Figure 2B:
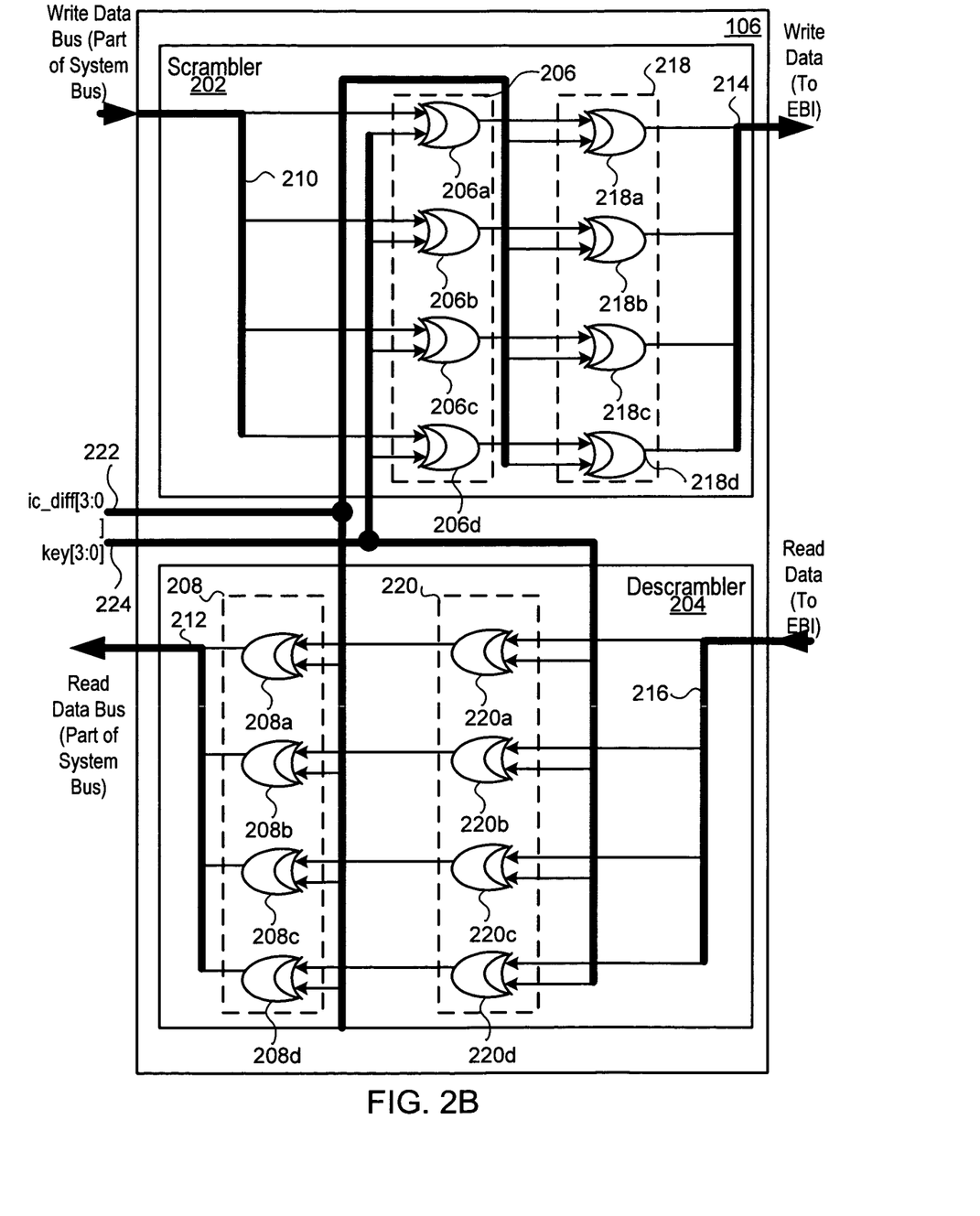
FIG. 2B is a block diagram of a modified data bus scrambler module.

FIG. 2B is a block diagram of a modified data bus scrambler module 106. The data bus scrambler module 106 includes an additional input for a constant or static value that is unique to the integrated circuit device containing the scrambler module 106. Some examples of constant data are a unique chip ID and a calibration fuse bit. Any constant or static data, however, can be used so long as the data is substantially constant for the life of the circuit device. In some implementations, the constant data is user-configurable. For example, the constant data can be provided by a user-configurable register accessible through a software interface.

Referring again to FIG. 2A, the additional input and two layers of 2-input XOR gates have been added. A first arrangement of additional XOR gates 218 have been added to the scrambler circuit 202. A second arrangement of additional XOR gates 220 have been added to the descrambler circuit 204. An additional input signal "ic_diff" drives both gate arrangements 218, 220 through signal 222.

The LSB of write input signal 210 drives one input of XOR gate 206a and the other input of XOR gate 206a is driven by the LSB of key signal 224. The output of XOR gate 206a drives one input of XOR gate 218a while the other input is driven by the LSB of input signal 222 carrying the unique, constant data "ic_diff." In this example configuration, a 4-bit bus is used. The output of XOR gate 218a drives the LSB of write output signal 214. An equivalent principal applies for each bit of write input signal 210, key signal 224 and ic_diff signal 222, up to the MSB.

An equivalent principal also applies to the descrambler circuit 204. The key and ic_diff signals 224, 222, carrying the key and ic_diff binary values are shared by both the scrambler circuit 202 and the descrambler circuit 204. The operation of the data bus scrambler module 106 can be described in reference to an example operation.

Assuming a binary value of "1010" (LSB being a binary value 0) driven on the key signal 224 and a binary value of "0111" driven on the ic_diff signal 222. If the write input signal 210 from system bus 120 carries the binary value of "0110," the resulting binary value is "1011", which is driven on write output signal 214. This result can be verified by applying the XOR Truth Table illustrated in Table I.

The binary value carried on write output signal 214 is different from the binary value carried on write input signal 210. In gate arrangement 206, the binary value "1010" carried by the key signal 224 is a XORed with the binary value carried on the write input signal 210 ("0110"), such that the output of XOR gate 206a is 0, the output of XOR gate 206b is 0, the output of XOR gate 206c is 1 and the output of XOR gate 206d is 1. The outputs of XOR gates 206 provide an intermediate binary value "1100" which is input to gates 218, together with the binary value "0111" carried by the ic_diff signal 222. The output of XOR gate 218a is 1, the output of XOR gate 218b is 1, the output of XOR gate 218c is 0, and the output of XOR gate 218d is 1, to provide the binary value of "1011." This result can be verified by applying the XOR Truth Table illustrated in Table I to both the first and second gate arrangements 206, 218.

If the key signal 224 remains constant, the output binary value carried on write output signal 214 will depend on the "ic_diff" signal 222. If "id_diff" is a binary value that is constant or static for the entire useful life of the circuit device and unique to the circuit device, then a different scrambling result can be achieved for the same data being processed by a microprocessor or any other circuitry that can write data out to external (off-chip) memories.

Referring now to the descrambling module 204, we assume that read input signal 216 from EBI is the data that was previously scrambled with the scrambler module 200 and written to an off-chip memory as "1011," with the same values on the key signal 224 (i.e., "1010") and "ic_diff" signal 222 (i.e., "0111"). The output of XOR gate 220a is an XOR between LSB of key signal 224 and LSB of read input signal 216, so 1. The output of XOR gate 220b is an XOR operation between LSB+1 of key signal 224 and LSB+1 of read input signal 216, so 0. The output of XOR 220c is an XOR operation between LSB+2 of key signal 224 and LSB+2 of read input signal 216, so 1. The output of XOR 220d is an XOR between LSB+3 (MSB) of key signal 224 and LSB+3 (MSB) of read input signal 216, so 1. Thus, the resulting intermediate binary value of the first layer of XOR gates 220 is "1101." This result drives the second layer of XOR gates 208.

Referring to the second layer of XOR gates 208, the output of XOR gate 208a is XOR between LSB of "ic_diff" signal 222 and LSB of the intermediate value output by XOR gate 220a, so 0. The output of XOR gate 208b is an XOR between LSB+1 of "ic_diff" signal 222 and LSB+1 of the intermediate value output by XOR gate 220b, so 1. The output of XOR gate 208c is XOR between LSB+2 of "ic_diff" signal 222 and LSB+2 of the intermediate value output by XOR gate 220c, so 0. The output of XOR 208d is an XOR between LSB+3 (MSB) of "ic_diff" signal 222 and LSB+3 (MSB) of XOR 220d, so 1. The resulting binary value carried on signal 212 is "1010" and equals the binary value of signal 210.

When the scrambler and descrambler circuits 202, 204, are part of the data bus module 106 shown in FIG. 1, the microprocessor core 101 is able to recover clear data or instructions even if the data or instructions stored in the off-chip memories remains scrambled.

The "id_diff" signal 222 makes the scrambling unique for each circuit device within a same family of circuit devices since the "ic_diff" signal 222 is derived from a unique chip identifier, fuse bit or other unique data available within the circuit device, and that remains constant or static over the life of the circuit device. For example, since a unique chip identifier has a constant value for the entire life of the circuit device, scrambled data can be recovered even if a long time has passed since the data was scrambled, provided the scrambling key does not change. Any value that is able to differentiate one circuit device from another circuit device that are in the same family or series of circuit devices, and is constant for the entire life of the circuit device can be used as "ic_diff" or to drive "ic_diff." If scrambling is important for off-chip memories, the same principal can be applied to on-chip memories to make chip intrusive attacks or expensive, non intrusive attacks harder to complete.

Example Scrambling/Descrambling Processes

Figure 3A:
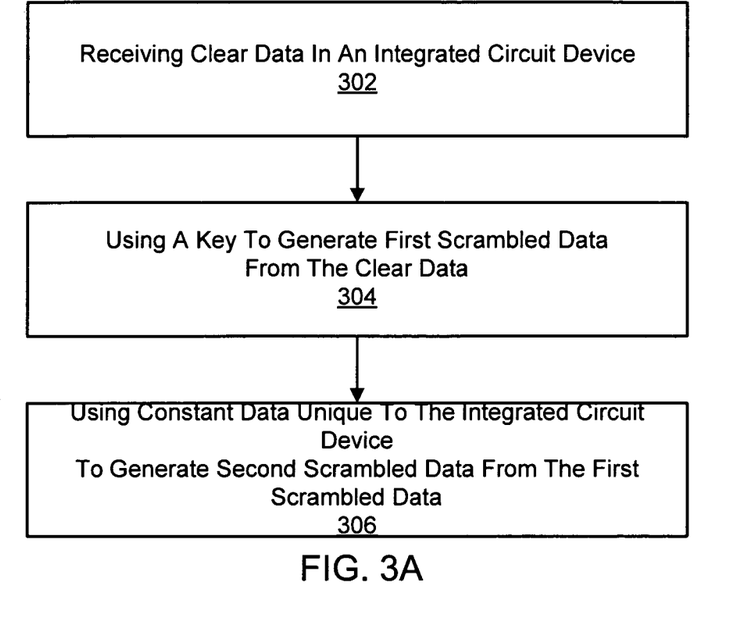
FIG. 3A is a flow diagram of an example process for scrambling data using a key and unique and constant data.

FIG. 3A is a flow diagram of an example process for scrambling data using a key and constant data. In some implementations, the process begins when a scrambling/descrambling module in an integrated circuit device receives clear data to be scrambled before being written to off-chip memory (302). A key is used to generate first scrambled data from the clear data (304). For example, a first layer of XOR gates can be operable to receive binary input from a key signal and write input signal, and to provide an intermediate binary value. A value that is unique to the circuit device, and that remains substantially constant over the life of the circuit device, can be used to generate second scrambled data from the first scrambled data (306). For example, a second layer of XOR gates can be operable to receive the intermediate binary value from the first layer of XOR gates, and to provide a binary output which is a scrambled version of the clear data. In some implementations, the unique value can be a unique chip identifier stored on the circuit device or a fuse bit embedded in the circuit device.

Figure 3B:
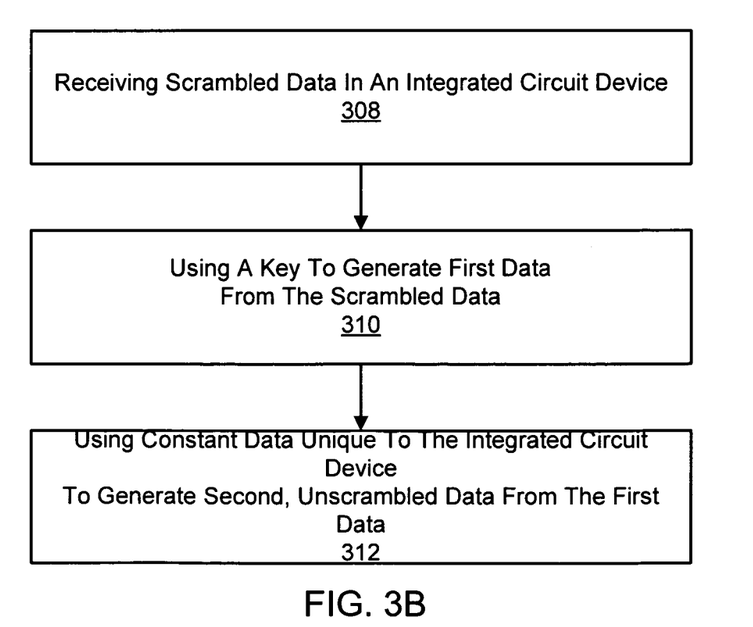
FIG. 3B is a flow diagram of an example process for descrambling data using a key and unique and constant data.

FIG. 3B is a flow diagram of an example process for descrambling data using a key and constant data. In some implementations, the process begins when a scrambling/descrambling module in an integrated circuit device receives scrambled data from off-chip memory (308). The same key used to scramble the clear data is used to generate a first intermediate binary value (310). For example, the scrambled data can be input, together with the key, into a first layer of XOR gates. The unique constant value used to scramble the first scrambled data is used to generate clear data from the first intermediate binary value (312). For example, the first intermediate binary value is input, together with the unique constant value, into a second layer of XOR gates to produce the clear data.

If more than one unique constant data is available for a circuit device, then more than two layers of XOR gates can be used to scramble or descramble data. In such a case, a first layer of XOR gates can apply the key, and two or more additional layers of XOR gates can apply the unique constant values to generate scrambled data to be written to off-chip memory.

What is claimed is:

1. A circuit device comprising:
    an interface for receiving input data, a scrambling key, and first constant data that is unique to the circuit device, the first constant data being user configurable and a combination of an identifier stored in a user-configurable and software accessible register of the circuit device that uniquely identifies the circuit device and second unique constant data based on calibrated fuse bits, where the calibrated fuse bits are programmed based on manufacturing factors, where the manufacturing factors include one or more of the following: process variation, wafer lot, and position of the circuit device on a wafer;
    a first circuit arrangement coupled to the interface and operable for receiving the input data and the scrambling key, the first circuit arrangement operable for applying the scrambling key to the input data to produce first scrambled data; and
    a second circuit arrangement coupled to the first circuit arrangement and operable for receiving the first scrambled data, the second circuit arrangement operable for applying the first constant data to the first scrambled data to generate second scrambled data.

2. The circuit of claim 1, where the interface is a bus.

3. The circuit of claim 1, where the second circuit arrangement further comprises:
    a second set of XOR gates, each XOR gate having inputs for receiving an intermediate value and a constant value.

4. The circuit of claim 1, where the scrambling key and the first constant data are combined to produce a scrambling key applied to the first or second circuit arrangements.

5. The circuit of claim 4, where the scrambling key depends on an address bus.

6. The circuit of claim 1, where the circuit device is coupled to one or more memories.

7. A method comprising:
    receiving clear data in an integrated circuit device;
    using a key to generate first scrambled data from the clear data; and
    using first constant data unique to the integrated circuit device to generate second scrambled data from the first scrambled data, the first constant data being user configurable and a combination of an identifier stored in a user-configurable and software accessible register of the circuit device that uniquely identifies the circuit device and second unique constant data based on calibrated fuse bits, where the calibrated fuse bits are programmed based on manufacturing factors, where the manufacturing factors include one or more of the following: process variation, wafer lot, and position of the circuit device on a wafer.

8. The method of claim 7, further comprising:
    storing the scrambled data in memory external to the integrated circuit device.

9. The method of claim 8, where receiving scrambled data comprises:
    receiving scrambled data from memory external to the integrated circuit device.

10. A method comprising:
    receiving scrambled data in an integrated circuit device;
    using a key to generate intermediate data; and
    using first constant data unique to the integrated circuit device to generate clear data from the first intermediate data, the first constant data being user configurable and a combination of an identifier stored in a user-configurable and software accessible register of the circuit device that uniquely identifies the circuit device and second unique constant data based on calibrated fuse bits, where the calibrated fuse bits are programmed based on manufacturing factors, where the manufacturing factors include one or more of the following: process variation, wafer lot, and position of the circuit device on a wafer.

11. A microcontroller system, comprising:
    a microprocessor core;
    an external bus controller;
    a scrambler unit coupled to the microprocessor and the external bus controller, the scrambler unit comprising:
    a first interface for receiving input data provided by the microprocessor core, a scrambling key, and first constant data that is unique to the microcontroller system, the first constant data being user configurable and a combination of an identifier stored in a user-configurable and software accessible register of the circuit device that uniquely identifies the circuit device and second unique constant data based on calibrated fuse bits, where the calibrated fuse bits are programmed based on manufacturing factors, where the manufacturing factors include one or more of the following: process variation, wafer lot, and position of the circuit device on a wafer;
    a second interface for sending scrambled data to the external bus controller;
    a first circuit arrangement coupled to the first interface and operable for receiving the input data and the scrambling key, the first circuit arrangement operable for applying the key to the input data to produce first scrambled data; and a second circuit arrangement coupled to the first circuit arrangement and to the second interface, the second circuit arrangement operable for receiving the first scrambled data, applying the first constant data to the first scrambled data to generate second scrambled data, sending the scrambled data to the external bus controller through the second interface.

12. The system of claim 11, where the second unique constant data is a fuse bit.

13. A circuit device comprising:

an interface for receiving input data, a first scrambling key, and first constant data that is unique to the circuit device, the first constant data being user configurable and a combination of an identifier stored in a user-configurable and software accessible register of the circuit device that uniquely identifies the circuit device and second unique constant data based on calibrated fuse bits, where the calibrated fuse bits are programmed based on manufacturing factors, where the manufacturing factors include one or more of the following: process variation, wafer lot, and position of the circuit device on a wafer;

a first circuit arrangement coupled to the interface and operable for receiving the first scrambling key and the constant data, the first circuit arrangement operable for combining the first scrambling key and the first constant data to produce a second scrambling key; and a second circuit arrangement coupled to the interface and to the first circuit arrangement, the second circuit arrangement operable for receiving the input data and the second scrambling key, the second circuit arrangement combining the second scrambling key and the input data to generate scrambled data.

14. The circuit of claim 13, where the first scrambling key depends on an address bus.

15. The circuit of claim 14, where the circuit device is embedded in microcontroller circuitry.

16. The circuit of claim 1, where the second circuit arrangement further comprises:

a set of XOR gates, each XOR gate having inputs for receiving a data value and a key value.

* * * * *

UNITED STATES PATENT AND TRADEMARK OFFICE
CERTIFICATE OF CORRECTION

PATENT NO. : 8,745,410 B2
APPLICATION NO. : 12/406817
DATED : June 3, 2014
INVENTOR(S) : Alain Vergnes and Renaud Tiennot It is certified that error appears in the above-identified patent and that said Letters Patent is hereby corrected as shown below:

In the Specification

Column 4, Line 64: delete "and or" and insert --and/or--.

In the Claims

Column 8, Claim 9, Line 27: delete "claim 8" and insert --claim 7--.

Column 10, Claim 15, Line 17: delete "claim 14" and insert --claim 13--.

Signed and Sealed this
Twelfth Day of August, 2014

Michelle K. Lee
*Deputy Director of the United States Patent and Trademark Office*